United States Patent
Tsukao et al.

(10) Patent No.: US 6,873,388 B2
(45) Date of Patent: Mar. 29, 2005

(54) SUBSTRATE FOR LIQUID CRYSTAL DISPLAY, LIQUID CRYSTAL DISPLAY HAVING THE SAME, AND METHOD OF MANUFACTURING THE SAME

(75) Inventors: Kouji Tsukao, Kawasaki (JP); Tsuyoshi Kamada, Kawasaki (JP); Teiji Majima, Kawasaki (JP)

(73) Assignee: Fujitsu Display Technologies Corporation, Kawasaki (JP)

(*) Notice: Subject to any disclaimer, the term of this patent is extended or adjusted under 35 U.S.C. 154(b) by 0 days.

(21) Appl. No.: 10/335,963

(22) Filed: Jan. 2, 2003

(65) Prior Publication Data

US 2003/0156231 A1 Aug. 21, 2003

(30) Foreign Application Priority Data

Jan. 4, 2002 (JP) .................................... 2002-000150

(51) Int. Cl.[7] ........................................... G02F 1/1343
(52) U.S. Cl. ...................................................... 349/138
(58) Field of Search ................................ 349/122, 138, 349/113

(56) References Cited

U.S. PATENT DOCUMENTS

| | | | | |
|---|---|---|---|---|
| 5,408,345 A | * | 4/1995 | Mitsui et al. | 349/42 |
| 5,463,483 A | * | 10/1995 | Yamazaki | 349/41 |
| 5,523,865 A | * | 6/1996 | Furuta et al. | 349/42 |
| 5,886,761 A | * | 3/1999 | Sasaki et al. | 349/122 |
| 6,490,019 B2 | * | 12/2002 | Lee et al. | 349/113 |
| 6,570,631 B2 | * | 5/2003 | Ko | 349/43 |
| 6,721,025 B2 | * | 4/2004 | Woo et al. | 349/124 |

FOREIGN PATENT DOCUMENTS

| | | | |
|---|---|---|---|
| JP | 2-294069 | 12/1990 | |
| JP | 5-241190 | 9/1993 | |
| JP | 06148679 A | * 5/1994 | ........... G02F/1/136 |
| JP | 9-127516 | 5/1997 | |
| JP | 2000-305086 | 11/2000 | |
| JP | 2001-044439 | 2/2001 | |

* cited by examiner

*Primary Examiner*—Kenneth Parker
(74) *Attorney, Agent, or Firm*—Greer, Burns & Crain, Ltd

(57) ABSTRACT

The invention relates to a substrate for a liquid crystal display that forms a part of a display of an information apparatus and a liquid crystal display having the same. The invention provides a substrate for a liquid crystal display which contributes to suppression of an increase in the number of manufacturing steps and an increase in a manufacturing cost and which improves the yield of manufacture, a liquid crystal display having the same, and a method of manufacturing the same. There is provided a base substrate that sandwiches a liquid crystal in combination with an opposite substrate provided opposite thereto and having an electrode formed thereon, a plurality of gate bus lines formed on the base substrate, a plurality of drain bus lines formed such that they intersect with the gate bus lines with an insulation film interposed therebetween, a light-reflective pixel electrode formed in each pixel region on the base substrate, thin film transistors formed in the vicinity of positions where the gate bus lines and the drain bus lines intersect with each other, and a protective film formed of a photosensitive material on the drain bus lines.

4 Claims, 10 Drawing Sheets

FIG.4A
FIG.4B
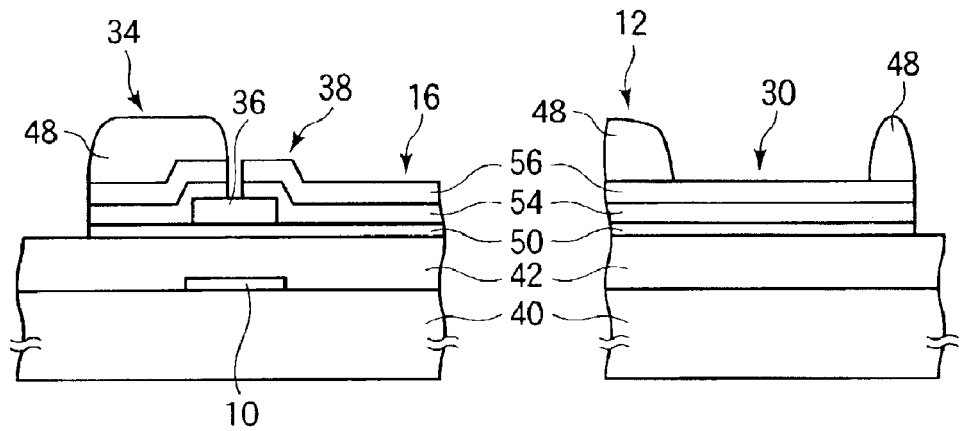
FIG.5A
FIG.5B
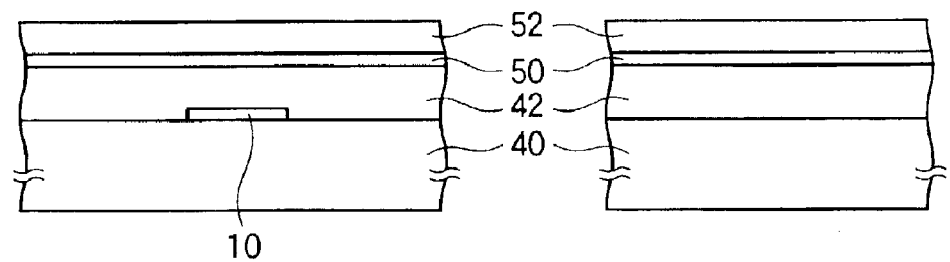

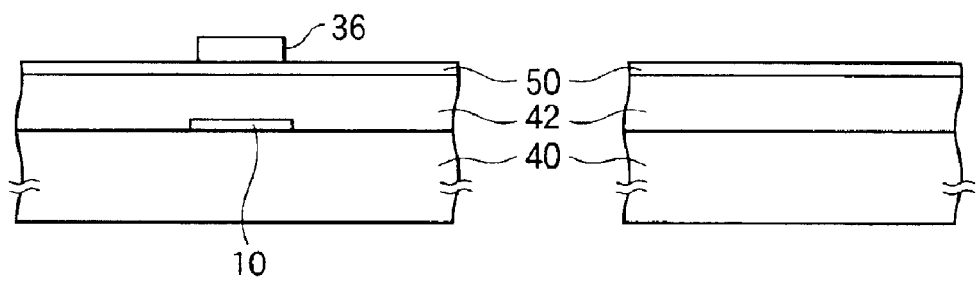
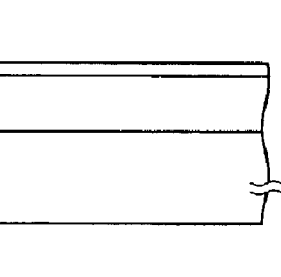
FIG.6A  FIG.6B
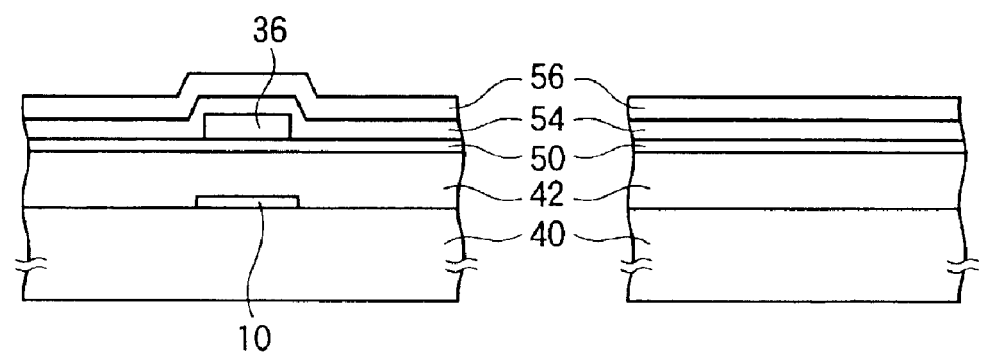
FIG.7A  FIG.7B

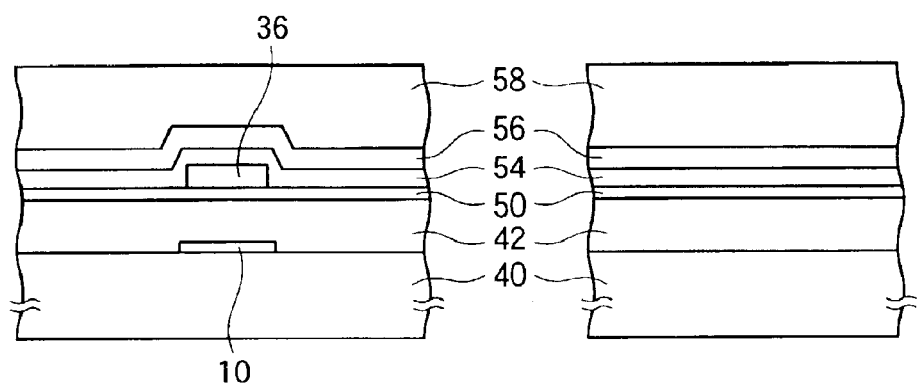
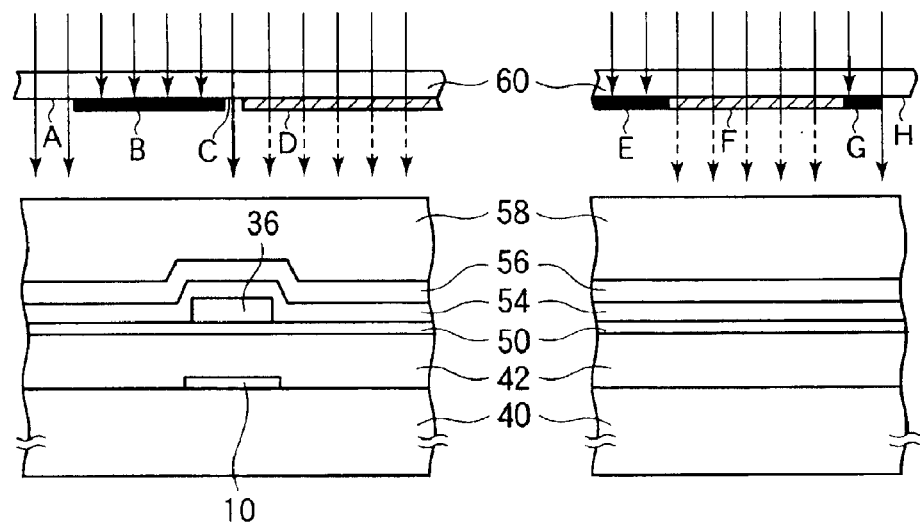

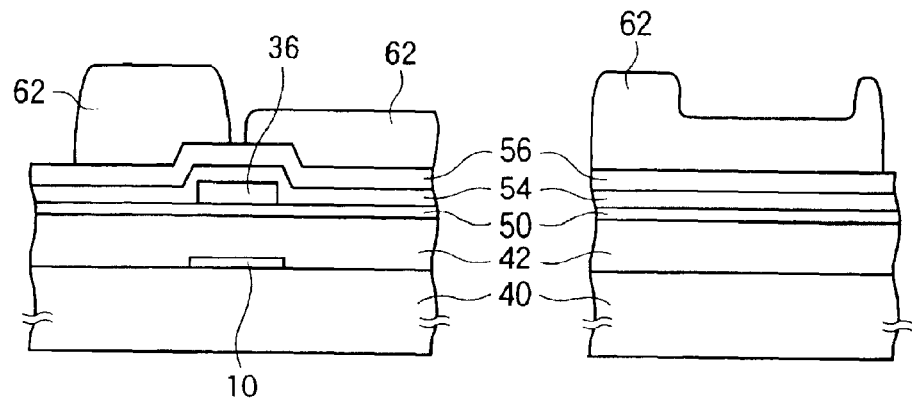
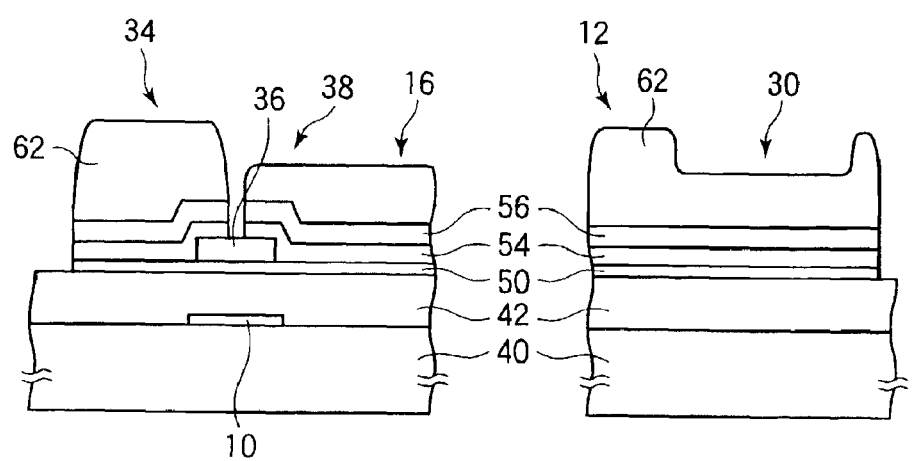

SUBSTRATE FOR LIQUID CRYSTAL DISPLAY, LIQUID CRYSTAL DISPLAY HAVING THE SAME, AND METHOD OF MANUFACTURING THE SAME

BACKGROUND OF THE INVENTION

1. Field of the Invention

The present invention relates to a substrate for a liquid crystal display that constitutes a display of an information apparatus and a liquid crystal display having the same.

2. Description of the Related Art

A liquid crystal display is constituted of a TFT substrate on which a thin film transistor (TFT) is formed in each pixel region, an opposite substrate provided opposite to the TFT substrate, and a liquid crystal sealed between the substrates. A TFT substrate for a transmissive liquid crystal display having inverted staggered type TFTs with a channel protection film is manufactured using five photo-masks, in general. A first photo-mask is used for forming gate bus lines, and a second photo-mask is used for forming a channel protection film. A third photo-mask is used for drain bus lines and source and drain electrodes, a fourth photo-mask is used for forming contact holes by providing openings in the protection film on the source electrodes. A fifth photo-mask is used for forming pixel electrodes. It is advantageous to reduce the number of photo-masks in reducing the manufacturing cost of a TFT substrate.

Unlike a transmissive liquid crystal display manufactured using five photo-masks, in the case of a TFT substrate for a reflective liquid crystal display having TFTs in the same configuration and having pixel electrodes that also serve as light reflecting plates, one photo-mask can be deleted because drain bus lines, source and drain electrodes, and pixel electrodes (reflective electrodes) are simultaneously formed from the same material. Further, since the drain bus lines, source and drain electrodes, and pixel electrodes are formed in the same layer, there is no need for a protective film between the source/drain electrodes and the pixel electrodes which is dispensable in a transmissive liquid crystal display.

In a reflective liquid crystal display, in general, alignment films are directly formed on a top surface of drain bus lines on a TFT substrate and on a top surface of a common electrode on an opposite substrate. If a conductive foreign substance enters the gap between the two substrates when they are combined, the foreign substance can penetrate the alignment films to contact a drain bus line and the common electrode directly. This results in short circuiting between the drain bus line and the common electrode. When short circuiting occurs between the drain bus lines and the common electrode, a line defect occurs because a grayscale voltage is not applied to the pixels on the same drain bus line. Since a line defect is a fatal detect of a product, it can reduce the yield of manufacture of liquid crystal displays.

In order to prevent a line defect attributable to short circuiting as described above, a protective film may be formed on drain bus line. However, when a protective film is formed on the drain bus lines, the protective film will extend on to regions which must be exposed such as regions above pixel electrodes and regions above drain bus line terminals that must be conductive. This results in a need for using a separate photo-mask to pattern the protective film such that openings are formed above the pixel electrodes and drain bus line terminals, which leads to problems such as an increase in the number of manufacturing steps and an increase in the manufacturing cost.

SUMMARY OF THE INVENTION

The invention provides a substrate for a liquid crystal display which makes it possible to prevent any increase in the number of manufacturing steps and manufacturing cost and to improve the yield of manufacture, a liquid crystal display having the same, and a method of manufacturing the same.

The above problems are solved by a substrate for a liquid crystal display characterized in that it has a base substrate that sandwiches a liquid crystal in combination with an opposite substrate provided opposite thereto, a plurality of gate bus lines formed on the base substrate, a plurality of drain bus lines formed such that they intersect with the gate bus lines with an insulation film interposed therebetween, a light-reflective pixel electrode formed in each pixel region on the base substrate, thin film transistors formed in the vicinity of positions where the gate bus lines and the drain bus lines intersect with each other, and a protective film formed of a photosensitive material on the drain bus lines.

A substrate for a liquid crystal display according to the invention is characterized in that the pixel electrode is formed of the same material as that of the drain bus lines.

The above-described problems are solved by a liquid crystal display having a pair of substrates and a liquid crystal sealed between the pair of substrates, characterized in that a substrate for a liquid crystal display according to the invention is used as either of the substrates.

Further, the above-described problems are solved by a method of manufacturing a substrate f or a liquid crystal display, characterized in that it has a first step of forming a metal layer to form drain bus lines, drain bus line terminals, and pixel electrodes on a base substrate, a second step of forming a photosensitive material layer, on the metal layer by applying a photosensitive material thereto, a third step of exposing the photosensitive material layer above the pixel electrodes and the drain bus line terminals with a low light exposure less than a required light exposure, a fourth step of developing the photosensitive material layer to form an etching mask that is smaller in thickness in regions above the pixel electrodes and the drain bus line terminals than in regions above the drain bus lines, a fifth step of etching the metal layer using the etching mask to form the drain bus lines, the drain bus line terminals, and the pixel electrodes, and a sixth step of performing an ashing process to remove the etching mask on the pixel electrodes and the drain bus line terminals.

A method of manufacturing a substrate for a liquid crystal display according to the invention is characterized in that the low light exposure is substantially one-half of the required light exposure.

A method of manufacturing a substrate for a liquid crystal display according to the invention is characterized in that the third step is performed using a photo-mask having transmittance that varies between a drawing pattern for forming the pixel electrodes and the drain bus line terminals and a drawing pattern for forming the drain bus lines.

Further, the above-described problems are solved by a method of detecting a defective position of a liquid crystal display characterized in that a voltage is applied between a plurality of drain bus lines and an electrode opposite thereto during a dynamic operating inspection such that the absolute value of the potential difference between the plurality of drain bus lines and the opposite electrode becomes greater than that in normal driving of the liquid crystal and in that the position of a defect is detected based on a gradated region displayed on the display screen.

Furthermore, the above-described problems are solved by a method of detecting a defective position of a liquid crystal display characterized in that a voltage is applied between the drain bus line and the electrode opposite thereto during a dynamic operating inspection, the drain bus line having a short circuiting defect between itself and the opposite electrode, such that the absolute value of the potential difference between the drain bus line and the opposite electrode becomes greater than that in normal driving of the liquid crystal and in that the position of the defect is detected based on a gradated region displayed on the display screen.

A method of detecting a defective position of a liquid crystal display according to the invention is characterized in that furthermore, the above-described problems are solved by a method of detecting a defective position of a liquid crystal display characterized in that a drain bus line having a short circuiting defect between itself and an electrode on an opposite substrate is identified; the drain bus line is broken between a drain bus line driving circuit that is connected to one end of the drain bus line and a display area; and a voltage is applied to the drain bus line from another end of the drain bus line.

BRIEF DESCRIPTION OF THE DRAWINGS

FIGS. 4A and 4B are sectional views showing a configuration of the substrate for a liquid crystal display in the first mode for carrying out the invention;

FIGS. 5A and 5B are sectional views taken at a manufacturing step showing a method of manufacturing the substrate for a liquid crystal display in the first mode for carrying out the invention;

FIGS. 6A and 6B are sectional views taken at a manufacturing step showing the method of manufacturing the substrate for a liquid crystal display in the first mode for carrying out the invention;

FIGS. 7A and 7B are sectional views taken at a manufacturing step showing the method of manufacturing the substrate for a liquid crystal display in the first mode for carrying out the invention;

FIGS. 8A and 8B are sectional views taken at a manufacturing step showing the method of manufacturing the substrate for a liquid crystal display in the first mode for carrying out the invention;

FIGS. 9A and 9B are sectional views taken at a manufacturing step showing the method of manufacturing the substrate for a liquid crystal display in the first mode for carrying out the invention;

FIGS. 10A and 10B are sectional views taken at a manufacturing step showing the method of manufacturing the substrate for a liquid crystal display in the first mode for carrying out the invention;

FIGS. 11A and 11B are sectional views taken at a manufacturing step showing the method of manufacturing the substrate for a liquid crystal display in the first mode for carrying out the invention;

DESCRIPTION OF THE PREFERRED EMBODIMENTS

First Mode for Carrying Out the Invention

Figure 1:
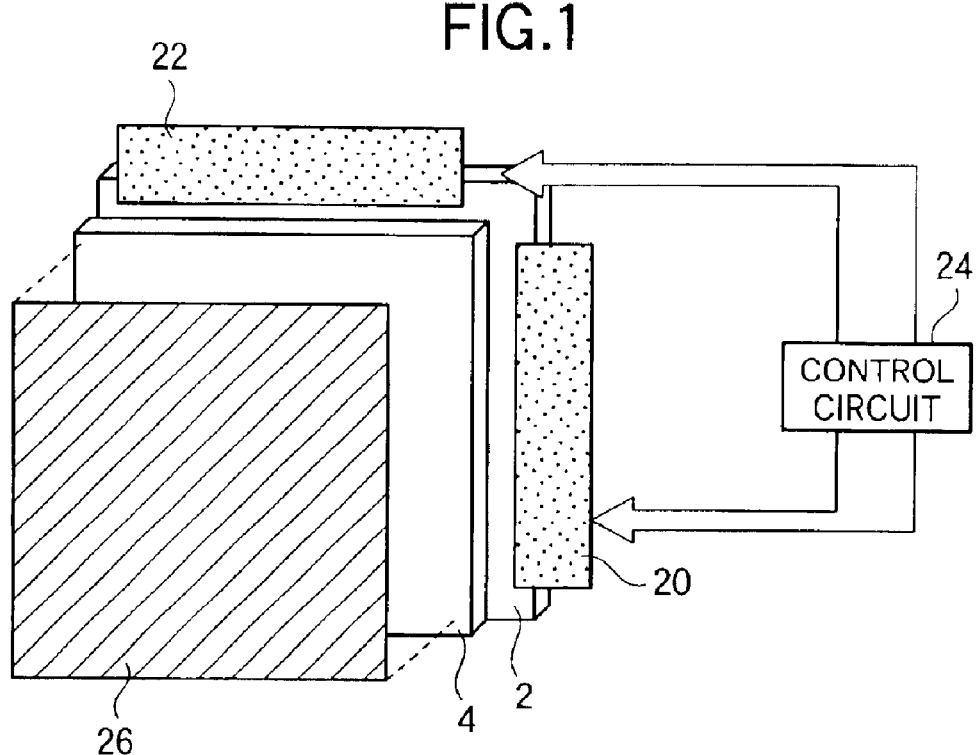
FIG. 1 shows a configuration of a liquid crystal display in a first mode for carrying out the invention.

A description will now be made with reference to FIGS. 1 to 11B on a substrate for a liquid crystal display, a liquid crystal display having the same, and a method of manufacturing the same in a first mode for carrying out the invention. FIG. 1 shows a schematic configuration of a reflective liquid crystal display in the present mode for carrying out the invention. The liquid crystal display has a structure in which a TFT substrate 2 having TFTs formed thereon and an opposite substrate 4 having a color filter (CF) formed thereon are combined in a face-to-face relationship to seal a liquid crystal between the substrates 2 and 4.

Figure 2:
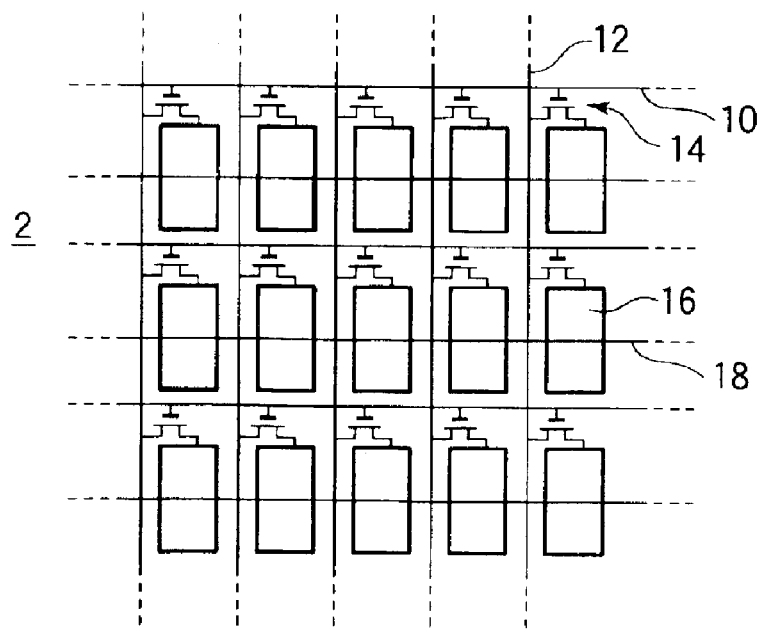
FIG. 2 shows an equivalent circuit of a substrate for a liquid crystal display in the first mode for carrying out the invention.

FIG. 2 shows an equivalent circuit of devices formed on the TFT substrate 2. A plurality of gate bus lines 10 extending in the horizontal direction in the figure are formed in parallel with each other on the TFT substrate 2. A plurality of drain bus lines 12 extending in the vertical direction in the figure are formed in parallel with each other such that they intersect with the gate bus lines 10 substantially at right angles with an insulation film which is not shown interposed therebetween. Each of regions enclosed by the plurality of gate bus lines 10 and the drain bus lines 12 serves as a pixel region of the TFT substrate 2. A TFT 14 and a pixel electrode (reflective electrode) 16 are formed at each pixel region. A drain electrode of each TFT 14 is connected to a drain bus line 12 adjacent thereto; a gate electrode of the same is connected to a gate bus line 10 adjacent thereto; and a source electrode of the same is connected to the pixel electrode 16. Substantially in the middle of each pixel region, a storage capacitor bus line 18 is formed in parallel with the gate bus lines 10. The TFTs 14, the pixel electrodes 16, and the bus lines 10, 12, and 18 are formed at photolithographic steps or formed by repeating a series of semiconductor processes, i.e., film formation followed by resist application, exposure, developing, etching, and removal of resist.

Although not shown, a light shield film (BM) that defines pixel regions on the opposite substrate 4 is formed on the opposite substrate 4. A CF resin layer in red (R), green (G), or blue (B) is formed in each of the pixel regions of the opposite substrate 4.

Referring to FIG. 1 again, on the TFT substrate 2 provided opposite to the opposite substrate 4 with a liquid crystal sealed therebetween, there is provided a gate bus line driving circuit 20 having driver ICs for driving the plurality of gate bus lines 10 and a drain bus line driving circuit 22 having driver ICs for driving the plurality of drain bus lines 4. The driving circuits 20 and 22 output scan signals and data signals to predetermined gate bus lines 10 or drain bus lines 12 based on a predetermined signal output by a control circuit 24. A polarizer 26 is applied to the surface of the opposite substrate 4 opposite to the surface on which color filters are formed.

Figure 3:
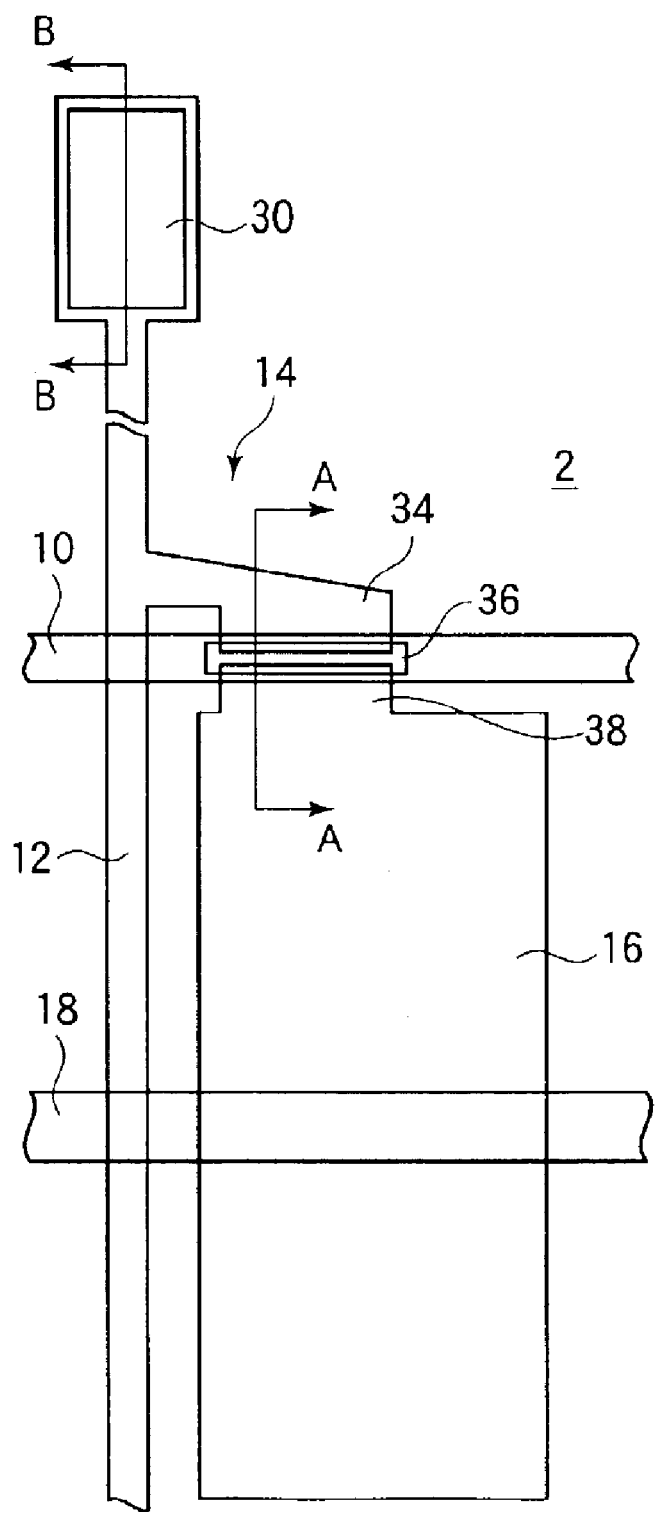
FIG. 3 shows a configuration of the substrate for a liquid crystal display in the first mode for carrying out the invention.

FIG. 3 shows a configuration of a substrate for a liquid crystal display in the present mode for carrying out the invention. FIG. 3 shows one pixel and a drain bus line terminal 30 formed at an end of a drain bus line 12. As shown in FIG. 3, a plurality of gate bus lines 10 extending in the horizontal direction in the figure are formed in parallel with each other on a TFT substrate 2 (only one line is shown in FIG. 3). A plurality of drain bus lines 12 extending in the vertical direction in the figure are formed in parallel with each other such that they intersect with the gate bus lines 10 substantially at right angles with an insulation film which is not shown interposed therebetween (only one line is shown in FIG. 3). TFTs 14 are formed in the vicinity of positions where the gate bus lines 10 and the drain bus lines 12 intersect with each other.

A drain electrode 34 of a TFT 14 is extracted from a drain bus line 12 adjacent thereto and is formed such that one end thereof is located at an edge of a channel protection film 36 formed on a gate bus line 10 on one side thereof. A source electrode 38 of the same is formed at another edge of the channel protection film 36 on another side thereof in a face-to-face relationship with the drain electrode 34. In such a configuration, the gate bus line 10 located directly below the channel protection film 36 serves as a gate electrode of the same TFT 14. A pixel electrode 16 electrically connected to the source electrode 38 is formed in the pixel region. A plurality of storage capacitor bus lines 18 extending in the horizontal direction in the figure are formed on the TFT substrate 2 such that they extend through the pixel regions substantially in the middle thereof (only one line is shown in FIG. 3). A drain bus line terminal 30 is formed at an end (upper end in the figure) of the drain bus line 12.

FIG. 4A is a sectional view showing a configuration of the neighborhood of the TFT 14 taken along the line A-A in FIG. 3. FIG. 4B is a sectional view showing a configuration of the neighborhood of the drain bus line terminal 30 taken along the line B-B in FIG. 3. As shown in FIG. 4A, a gate bus line (gate electrode) 10 is formed on a glass substrate 40. A gate insulation film 42 is formed on the gate bus line 10. An amorphous silicon (a-Si) layer 50 is formed on the gate insulation film 42. The channel protection film 36 is formed on the a-Si layer 50, and the a-Si layer 50 directly below the channel protection film 36 serves as a channel region. The drain electrode 34 and the source electrode 38 are formed on the channel protection film 36 opposite to each other with a predetermined gap kept therebetween. On the drain electrode 34, a protective film 48 is provided which is formed by leaving a resist layer used for patterning the drain electrode 34 unremoved. The pixel electrode 16 is formed of the same material as that of the source electrode 38.

As shown in FIG. 4B, protective films 48 are provided at the right end of the drain bus line terminal 30 in the figure and on the drain bus line 12, the films being formed by leaving a resist layer used for patterning the drain bus line terminal 30 and the drain bus line 12 unremoved.

As thus described, in the present mode for carrying out the invention, the protective films 48 formed by leaving resist layers unremoved are provided on the drain bus lines 12 of the reflective liquid crystal display in which the drain bus lines 12, the drain electrodes 34, the source electrodes 38 and the pixel electrodes 16 are formed of the same material. This reduces the possibility of short circuiting between the drain bus lines 12 and the common electrode attributable to a conductive foreign substance. Therefore, the yield of manufacture of liquid crystal displays is improved.

A description will now be made with reference to FIGS. 5A to 11B on a method of manufacturing a substrate for a liquid crystal display in the present mode for carrying out the invention. FIGS. 5A to 11B show steps for manufacturing the TFT substrate 2 shown in FIG. 3. FIGS. 5A, 6A, 7A, 8A, 9A, 10A, and 11A show a section of the neighborhood of the TFT 14 taken along the line A—A in FIG. 3. FIGS. 5B, 6B, 7B, 8B, 9B, 10B, and 11B show a section of the neighborhood of the drain bus line terminal 30 taken along the line B—B in FIG. 3. As shown in FIGS. 5A and 5B, for example, an aluminum (Al) film is formed throughout a top surface of a glass substrate 40 to form a metal layer. Next, the metal layer is patterned using a first photo-mask to form gate bus lines 10 (see FIG. 5A). For example, a silicon nitride film (SiN film) is then formed on the entire surface of the substrate using plasma CVD to form an insulation film (gate insulation film) 42. Next, an a-Si layer 50 for forming channel regions is formed on the entire surface of the substrate using plasma CVD. Then, a silicon nitride film (SiN film) 52 for forming a channel protection film is continuously formed using plasma CVD.

Next, the glass substrate 40 is exposed on a backside thereof from below in the figure using the gate bus lines 10 as a mask, and exposure is further performed using a second photo-mask to form an etching mask (not shown) on the gate bus lines 10 on a self-alignment basis. Next, the SiN film 52 formed on the gate bus lines 10 is etched using the etching mask to form a channel protection film 36 on the gate bus lines 10 in the regions where the TFTs 14 are to be formed (see FIGS. 6A and 6B).

Next, an n$^+$a-Si layer 54 for forming an ohmic contact layer is formed on the entire surface using plasma CVD as shown in FIGS. 7A and 7B. Then, a metal layer 56 for forming the drain bus lines 12, drain electrodes 34, source electrodes 38 and pixel electrodes 16 is formed using sputtering.

Next, as shown in FIGS. 8A and 8B, resist that is a photosensitive material is applied to the entire surface to form a resist layer 58. The resist layer 58 is then exposed using a third photo-mask 60 as shown in FIGS. 9A and 9B. Regions B, E, and G on the photo-mask 60 (solid black regions in the figure) are regions where the protective films 48 as shown in FIGS. 4A and 4B are to be formed. In the regions B, E, and G, drawing patterns for blocking light (indicated by arrows in the figures) are formed. In regions D and F on the photo-mask 60 (hatched regions in the figures), there is formed drawing patterns for a gray mask that transmits light with predetermined transmittance. The resist layer 58 under the regions D and F is exposed to light transmitted by the gray mask (indicated by arrows in broken lines in the figures) with a low light exposure that is substantially one-half of a required light exposure (EPH), for example. Thus, the photo-mask 60 is formed such that it is different in transmittance between the drawing patterns in the regions B, E and G for forming the protective films 48 as shown in FIGS. 4A and 4B and the drawing patterns in the regions D and F where no protective film 48 is formed. In the semi-transmissible regions D and F, the quantity of transmitted light may be adjusted using a drawing pattern in the form of slits instead of the gray mask. No drawing pattern is formed in regions A, C, and H on the photo-mask 60 to allow light to pass.

When the resist layer 58 thus exposed is developed, there is provided an etching mask 62 whose thickness varies depending on regions of the same as shown in FIGS. 10A and 10B. For example, the thickness of the etching mask 62 is 2.4 μm in regions above the drain bus lines 12 and the drain electrodes 34, and the thickness of the etching mask 62 in regions above the drain bus line terminals 30 and pixel electrodes 16 is 1.2 μm.

Next, the metal layer 56, the n$^+$a-Si layer 54, and the a-Si layer 50 are dry-etched using the etching mask 62 to form the drain bus lines 12, drain electrodes 34, source electrodes 38 and pixel electrodes 16 as shown in FIGS. 11A and 11B. During the etching process, the channel protection film 36 serves as an etching stopper to leave the a-Si layer 50 under the channel protection film 36.

The substrate is then processed in an oven for 10 minutes at 140° C., for example, with the etching mask 62 left unpeeled. This reduces the thickness of the etching mask 62 in the regions above the drain bus lines 12 and drain electrodes 34 to about 1.5 μm and reduces the thickness of the etching mask 62 in the regions above the drain bus line terminals 30 and pixel electrodes 16 to about 0.5 μm.

Next, an ashing process is performed on the entire surface of the substrate to remove the etching mask 62 partially by a thickness of 0.7 μm. As a result, the etching mask 62 is left with a thickness of about 0.8 μm in the regions above the drain bus lines 12 and the drain electrodes 34 to serve as a protective film 48, and the etching mask 62 is removed from the regions above the drain bus line terminals 30 and pixel electrodes 16 without any residue. Openings (not shown) in the insulation film 42 above the gate bus line terminals are formed using a fourth photo-mask. A TFT substrate 2 as shown in FIGS. 4A and 4B is completed through the above-described steps. Thereafter, it is combined with an opposite substrate 4, and a liquid crystal is sealed between the substrates 2 and 4 to complete a liquid crystal display.

In the present mode for carrying out the invention, the protective film 48 above the drain bus lines 12 without using an additional photo-mask. This makes it possible to prevent any increase in the manufacturing cost and to provide a substrate for a liquid crystal display with an improved yield of manufacture, a liquid crystal display having the same, and a method of manufacturing the same.

Second Mode for Carrying Out the Invention

Figure 12:
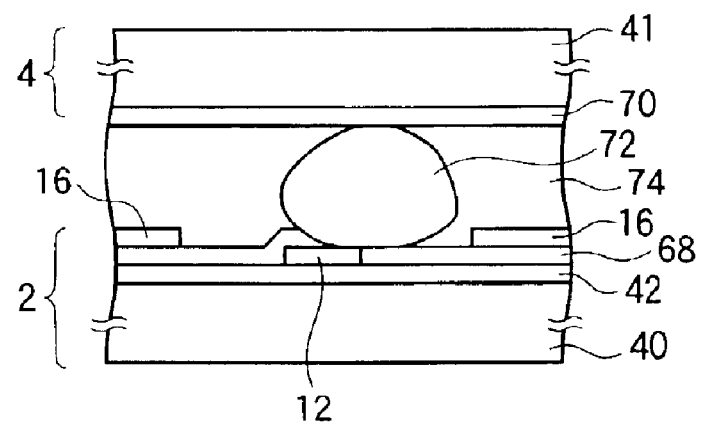
FIG. 12 is a sectional view showing a state of a liquid crystal display in the related art in which short circuiting has occurred due to a foreign substance to present a background of a second mode for carrying out the invention.

A description will now be made with reference to FIGS. 12 to 18 on a substrate for a liquid crystal display, a liquid crystal display having the same, and a method of detecting a defective position of the same in a second mode for carrying out the invention. A description will be made on a short circuiting defect that occurs between substrates of a liquid crystal display and a dynamic operating inspection in the related art for detecting such a short circuiting defect, as a background of the present mode for carrying out the invention. FIG. 12 is a sectional view of a liquid crystal display taken perpendicularly to the direction in which drain bus lines 12 extend, and it shows a state in which short circuiting has been caused by a conductive foreign substance 72 between a drain bus line 12 on a TFT substrate 2 and a common electrode 70 on an opposite substrate 4. As shown in FIG. 12, the TFT substrate 2 has an insulation film 42 that entirely covers a top surface of a glass substrate 40. A plurality of drain bus lines 12 are formed on the insulation film 42. A protective film 68 is formed on the entire top surface of the drain bus lines 12. A pixel electrode 16 of each pixel is formed on the protective film 68. The opposite substrate 4 has the common electrode 70 that extends throughout a surface of a glass substrate 41. The TFT substrate 2 and the opposite substrate 4 are combined in a face-to-face relationship, and a liquid crystal 74 is sealed between the substrates 2 and 4. The drain bus lines 12 and the common electrode 70 are short circuited by the conductive foreign substance 72 sandwiched therebetween.

The above-described short circuiting defect can be repaired, if the short circuiting position (address) can be identified, by breaking the drain bus line 12 before and after that position to isolate the short circuiting region electrically and by allowing a grayscale voltage to be applied to the drain bus line 12 beyond the short circuiting position through a repair line.

Figure 13:
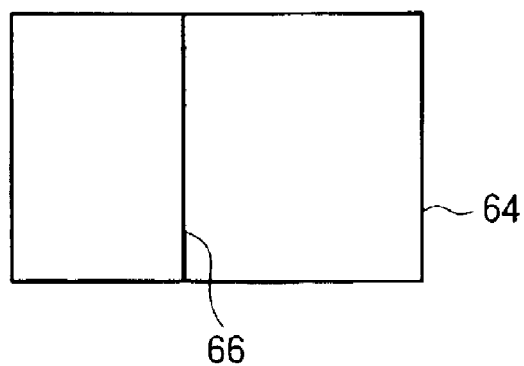
FIG. 13 shows a display screen during a dynamic operating inspection in the related art to present a background of the invention.

FIG. 13 shows a display area 64 during a dynamic operating inspection in the related art conducted on a normally black mode liquid crystal display having a short circuiting defect as described above. As shown in FIG. 13, when gray or white is displayed in the display area 64, since no grayscale voltage is applied to pixel electrodes 16 that are connected to a drain bus line 12 that is short circuited, a black line 66 extending in the vertical direction in the figure is displayed in the display area 64. The address of the short circuiting position on the side of the drain bus line 12 can be easily identified from the black line 66. In the case of a normally white mode liquid crystal display, when gray or black is displayed in a display area, a white line will be displayed along any drain bus line 12 which is short circuited.

As thus described, it is difficult to identify the address of a short circuiting position on the side of the gate bus line 10 by conducting the dynamic operating inspection in the related art, although it allows the address on the side of drain bus line 12 to be easily identified. It is therefore necessary to check any abnormality of the appearance of the short circuiting bus line 12 from one end of the same to the other with a microscope. This has resulted in a problem in that it takes a long time to identify a short circuiting position, which increases the manufacturing cost.

In the case that the foreign substance 72 has an extremely small size or overlaps the drain bus line 12 when viewed in a direction perpendicular to the substrate surface, the short circuiting position can not be identified because external abnormality can not be recognized even with a microscope. Therefore, a line defect attributable to the short circuiting cannot be repaired, which results in a problem in that yield of manufacture is reduced.

The present mode for carrying out the invention provides a substrate for a liquid crystal display on which the position of a short circuiting defect can be easily and reliably detected, a liquid crystal display having the same, and a method of detecting a defective position on the same.

In the present mode for carrying out the invention, during a dynamic operating inspection on a liquid crystal display, a drain bus line 12 that is short circuited is applied with a voltage such that the absolute value of a potential difference between the drain bus line 12 and an opposite electrode 70 becomes greater than that for normal driving of the liquid crystal, which allows the short circuiting position to be identified on the side of the gate bus line 10. A more specific description will be made with reference to Embodiment 2-1 and Embodiment 2-2 on a substrate for a liquid crystal display, a liquid crystal display having the same, and a method of detecting a defective position on the same in the present mode for carrying out the invention.

Embodiment 2-1

Figure 14:
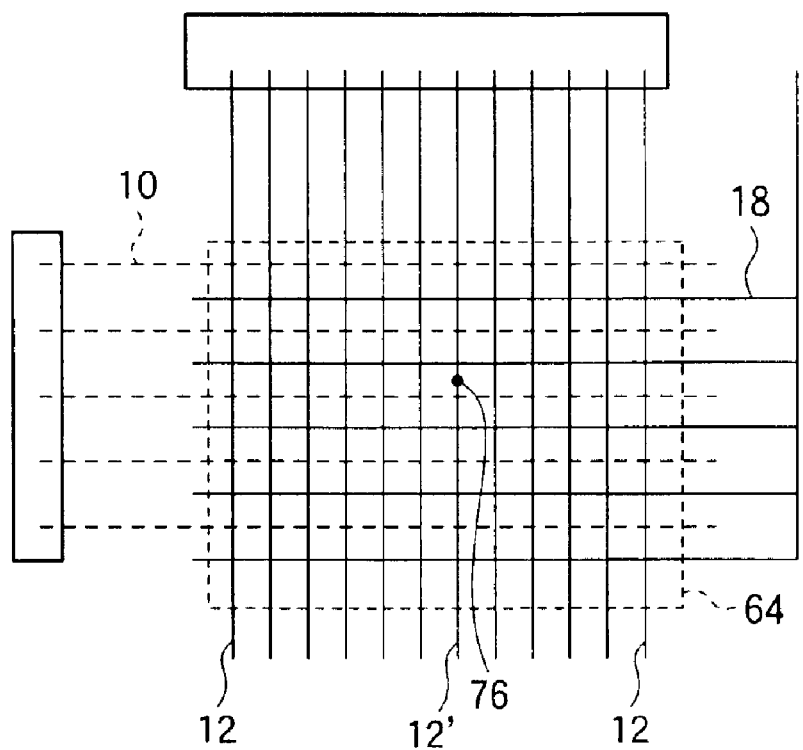
FIG. 14 illustrates a method of detecting a defective position of a liquid crystal display according to Embodiment 2-1 in the second mode for carrying out the invention.

A description will now be made with reference to FIGS. 14 and 15 on a method of detecting a defective position of a liquid crystal display according to Embodiment 2-1 in the present mode for carrying out the invention. FIG. 14 schematically shows a liquid crystal display on which the method for detecting a defective position in the present mode for carrying out the invention is used. As shown in FIG. 14, in a display area 64, a plurality of gate bus lines 10 extending in the horizontal direction in the figure and a plurality of drain bus lines 12 extending in the vertical direction in the figure are formed substantially orthogonally to each other with an insulation film interposed therebetween. A plurality of storage capacitor bus lines 18 are formed substantially in parallel with the gate bus lines 10. The plurality of storage capacitor bus lines 18 are electrically connected to each other, and a predetermined common voltage is applied to them. A drain bus line 12' among the plurality of drain bus lines 12 has been short circuited with a common electrode 70 on an opposite substrate 4 by a conductive foreign substance 72 in a short circuiting part 76 shown in FIG. 12.

During a dynamic operating inspection, a gate pulse having a pulse width of 100 μsec that yields a voltage level of −10 V in an off state and a voltage level of 21 V in an on state is simultaneously applied to the gate bus lines 10 at a repetition frequency of 60 Hz. The drain bus lines 12 are electrically connected upward in the figure to apply a voltage (of −70 V, for example) to the drain bus lines 12 such that the absolute value of a potential difference between the drain bus lines 12 and the opposite electrode 70 becomes greater than that of a voltage (±5 V) for normal driving of the liquid crystal. A voltage of 0 V is applied to the common electrode 70 and the storage capacitor bus lines 18.

The potential of the drain bus line 12' having a short circuiting defect approaches the potential of the common electrode 70 on the opposite substrate 4 from the value on the voltage-applied side as the short circuiting part 76 become closer and reaches substantially the same potential as that of the common electrode 70 at the short circuiting part 76. The drain bus line 12' has substantially the same potential as that of the common electrode 70 (0 V) on the side beyond the short circuiting part 76 (downward in the figure) when viewed from the voltage-applied side.

When the gate pulse is applied to turn on the TFTs 14, the voltage on the gate bus line 12' is written in each of the pixel electrodes 16 at the pixels on the drain bus line 12' having a short circuiting defect. Since the liquid crystal at each pixel is driven by a potential difference between the respective pixel electrode 16 and the common electrode 70, a line defect having a luminance distribution as shown in FIG. 15 will be visually recognized.

Figure 15:
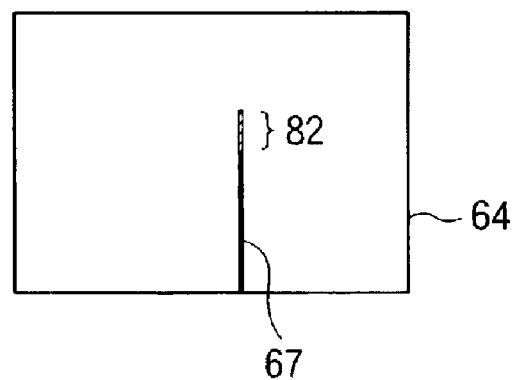
FIG. 15 illustrates the method of detecting a defective position of a liquid crystal display according to Embodiment 2-1 in the second mode for carrying out the invention.

FIG. 15 shows a display area 64 during a dynamic operating inspection performed on a normally black mode liquid crystal display according to the above-described method. As shown in FIG. 15, a black line 67 is displayed only in a lower part of the display area 64 that displays white. Between the end of the black line 67 and the white region, there is a gradated region (luminance gradient region) 82 in which the grayscale gradually changes from black to white upward in the figure.

The luminance gradient region 82 is formed in accordance with the fact that a potential of each position on the drain bus line 12' is closer to a potential of a common electrode 70 on an opposite substrate 4, the closer the position to the short circuiting part 76 from the voltage-applied side and that the potential becomes substantially the same as that of the common electrode 70 at the short circuiting part 76. Therefore, the short circuiting part 76 can be easily identified by observing the neighborhood of the luminance gradient region 82 with a microscope. For example, in the case of a liquid crystal display having a display screen of a diagonal dimension of about 15 inches, the position of a short circuiting part 76 can be located within a range of 2 cm or less. Thereafter, the neighborhood of the luminance gradient region 82 of the drain bus line 12' is checked for any external abnormality with a microscope to identify the position of the short circuiting part 76. By floating the common electrode 70 or connecting the same to a common potential through a resistor to decrease the current flowing to the common electrode 70, the occurrence of a potential gradient on the drain bus line 12' can be promoted to narrow down the range to be checked for the position of the short circuiting part 76.

According to the present embodiment, since the address of the short circuiting part 76 on the gate bus line side can be searched in a narrow range, the position of the short circuiting part 76 can be easily identified using a microscope. Since the position of the short circuiting part 76 can be identified in a short time by thus simplifying the process of detecting a defective position, any increase in the manufacturing cost can be prevented, and yield of manufacture is improved.

According to the invention, since a voltage having an absolute value greater than that for normal driving of a liquid crystal is applied to all drain bus lines 12 including the bus line 12', there will be no fluctuation of the threshold of the TFTs 14 on the drain bus line 12' compared to the other TFTs.

Embodiment 2-2

Figure 16:
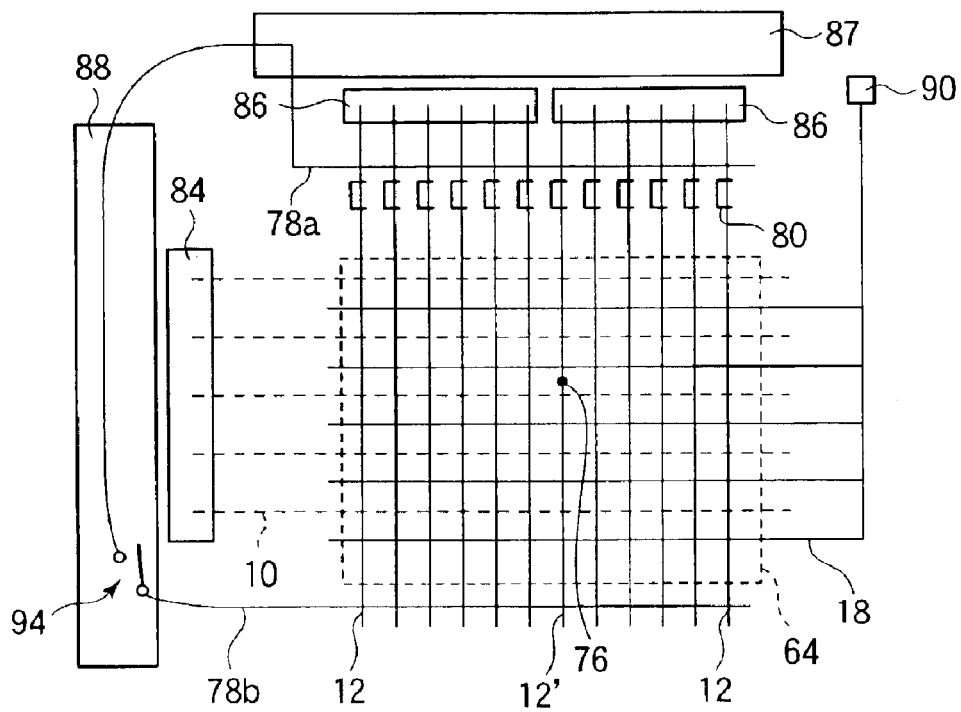
FIG. 16 illustrates a method of detecting a defective position of a liquid crystal display according to Embodiment 2-2 in the second mode for carrying out the invention.

A description will now be made with reference to FIGS. 16 to 18 on a substrate for a liquid crystal display, a liquid crystal display having the same and a method of detecting a defective position of the same according to Embodiment 2-2 in the present mode for carrying out the invention. FIG. 16 schematically shows a liquid crystal display on which a method of detecting a defective position in the present mode for carrying out the invention is used. Components having functions and effect like those in the liquid crystal display of the Embodiment 1-1 shown in FIG. 14 are indicated by like reference numerals and will not be described here. Left ends of a plurality of gate bus lines 10 in the figure are connected to a gate bus line driving circuit 84. Upper ends of a plurality of drain bus lines 12 in the figure are connected to a plurality of (two in FIG. 16) drain bus line driving circuits 86.

Both ends of the drain bus lines 12 intersect repair wirings 78a and 78b which are routed through peripheral circuit substrates 87 and 88 so as to bypass the a display area 64 with an insulation film (not shown) interposed therebetween. The repair wirings 78a and 78b are connected to each other through a switch 94 provided on the peripheral circuit board 88. In the figure, the contact of the switch 94 is open. Drain bus line bypass wirings 80 are formed between the positions where the drain bus lines 12 and the repair line 78 intersect with each other and the display area 64, the wirings 80 having a U-shaped configuration to bypass the drain bus lines 12 when viewed in a direction perpendicular to the substrate surface. Both ends of the drain bus line bypass wirings 80 intersect the drain bus lines 12 with the insulation film interposed therebetween. The plurality of storage capacitor bus lines 18 are electrically connected to each other and are connected to a common terminal 90.

Figure 17A:
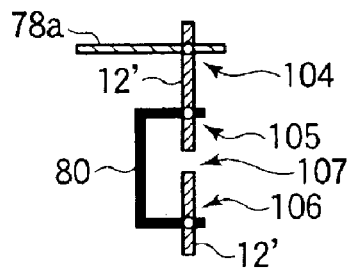
FIGS. 17A, 17B, and 17C illustrate the method of detecting a defective position of a liquid crystal display according to Embodiment 2-2 in the second mode for carrying out the invention.
Figure 17B:
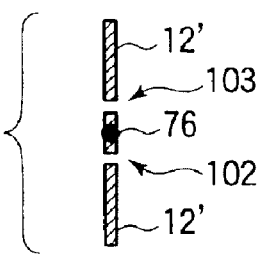
Figure 17C:
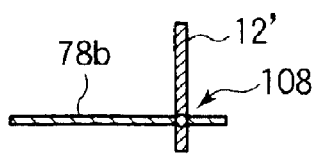

A method of detecting a defective position of the liquid crystal display in the present mode for carrying out the invention will now be described with reference to FIGS. 17A to 18. FIG. 17A shows a configuration of the neighborhood of the positions where a drain bus line 12' that is short circuited intersects with the drain bus line bypass wiring 80 and the repair wiring 78. FIG. 17B shows a configuration of the neighborhood of a short circuiting part 76 of the drain bus line 12'. FIG. 17C shows a configuration of the neighborhood of the position where the drain bus line 12' intersects the repair wiring 78.

First, the drain bus line 12' that is short circuited is identified through a dynamic operating inspection in the related art as shown in FIG. 13. Next, a cutting position 107 of the drain bus line 12' is cut by a laser beam to electrically separate the drain bus line 12' in the display area 64 from the drain bus line driving circuit 86, as shown in FIG. 17A. As shown in FIG. 17C, a connecting portion 108 is irradiated with a laser beam to electrically connect the drain bus line 12' and the repair wiring 78b.

Next, the dynamic operating inspection is conducted again. At the dynamic operating inspection, a gate pulse having a pulse width of 100 μsec that yields a voltage level of −10 V in an off state and a voltage level of 21 V in an on state is simultaneously applied to the gate bus lines 10 at a repetition frequency of 60 Hz. A grayscale voltage of ±6 V is applied to the drain bus lines 12. A voltage of 0 V is applied to a common electrode 70 and the storage capacitor bus lines 18. A voltage of −70 V, for examole is applied to the repair wiring 78b for one second from a voltage source which is not shown. That is, the grayscale voltage of ±6 V is not applied to the drain bus line 12', that is short circuited, and the voltage of −70 V is applied to the same. The value and duration of the voltage applied to the drain bus line 12' are set such that no display failure occurs because of shortage of a current supplied to TFTs 14 in an on state or increase of leak current in an off state.

Figure 18:
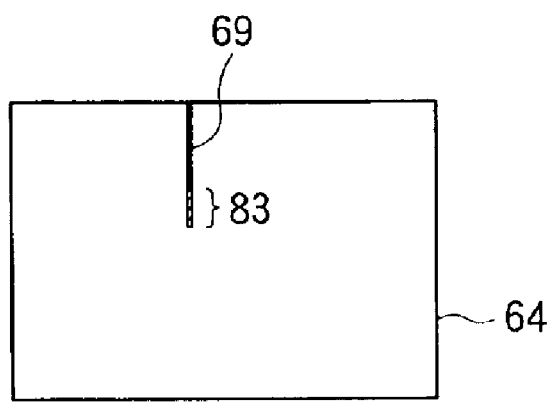
FIG. 18 illustrates the method of detecting a defective position of a liquid crystal display according to Embodiment 2-2 in the second mode for carrying out the invention.

FIG. 18 shows a display area 64 during a dynamic operating inspection performed on a normally black mode liquid crystal display according to the above-described method. As shown in FIG. 18, a black line 69 is displayed only in an upper part of the display area 64 that displays white. Between the end of the black line 69 and the white region, there is a luminance gradient region 83 in which the grayscale gradually changes from black to white downward in the figure.

External abnormality is checked only in the neighborhood of the luminance gradient region 83 of the drain bus line 12' using a microscope as done in Embodiment 2-1 to identify the position of the short circuiting part 76.

According to the present embodiment, since the gate bus line side address of the short circuiting part 76 where the drain bus line 12' and the common electrode 70 are short circuited can be searched in a narrow limited range similarly to Embodiment 2-1, the position of the short circuiting part 76 can be easily identified using a microscope. Since the position of the short circuiting part 76 can be identified in a short time by simplifying the process of detecting a defective position, any increase in the manufacturing cost can be prevented, and yield of manufacture is improved.

A description will now be made on a method for repairing a line defect attributable to the short circuiting at the short circuiting part 76. First, as shown in FIG. 17B, cutting portions 102 and 103 before and after the short circuiting part 76 whose position has been identified according to the present embodiment are cut by a laser beam. As a result, the drain bus line 12' and the short circuiting part 76 are electrically separated from each other. Next, as shown in FIG. 17A, connecting portions 105 and 106 are irradiated with a laser beam to electrically connect the drain bus line 12' and both ends of the drain bus line bypass wiring 80. Thus, the drain bus line 12' that has been cut at the cutting portion 107 is repaired. The connecting portion 104 is irradiated with a laser beam to electrically connect the drain bus line 12' and the repair wiring 78a. Then, the contact of the switch 94 on the peripheral circuit substrate 88 is closed to electrically connect the repair wirings 78a and 78b. Thus, the grayscale voltage to be applied to the drain bus line 12' is applied to the part of the same below the cutting portions 102 and 103 as viewed in the figure through the repair wirings 78a and 78b. The line defect attributable to the short circuiting at the short circuiting part 76 can be repaired through the above-described steps.

In case that the characteristics of the TFTs 14 on the drain bus line 12' have changed relative to the TFTs 14 on other drain bus lines 12, a voltage having polarity opposite to that of the voltage applied during the dynamic operating inspection may be applied between the drain bus line 12' and the common electrode 70 to restore the characteristics of the TFTs 14. The characteristics of the TFTs 14 may be restored by heating the panel to a temperature of 50° C. or more or applying a continuous pulse voltage to the gate bus lines 18.

The invention is not limited to the above-described modes for carrying out the same and may be modified in various ways.

For example, while resist is used as a photosensitive material in the first mode for carrying out the invention, this is not limiting the invention, and photosensitive polyimide may be used.

While the etching mask 62 having different thicknesses is formed by exposing the same using a gray mask in the first mode for carrying out the invention, this is not limiting the invention, and the etching mask 62 having different thicknesses may be formed using multiple exposure.

As described above, the invention makes it possible to provide a substrate for a liquid crystal display which contributes to suppression of a manufacturing cost increase and which improves the yield of manufacture, a liquid crystal display having the same, and a method of manufacturing the same.

What is claimed is:

1. A substrate for a liquid crystal display comprising:
   a base substrate that sandwiches a liquid crystal in combination with an opposite substrate provided opposite thereto;
   a plurality of gate bus lines formed on the base substrate;
   a plurality of drain bus lines formed such that they intersect with the gate bus lines with an insulation film interposed therebetween;
   a light-reflective pixel electrode formed in each pixel region on the base substrate;
   thin film transistors formed in the vicinity of positions where the gate bus lines and the drain bus lines intersect with each other; and
   a protective film formed the drain bus lines by leaving a resist layer made of a photosensitive material used for patterning the drain bus lines.

2. A substrate for a liquid crystal display according to claim 1, wherein the pixel electrode is formed of the same material as that of the drain bus lines.

3. A liquid crystal display having a pair of substrates and a liquid crystal sealed between the pair of substrates, wherein a substrate for a liquid crystal display according to claim 1 is used as either of the substrates.

4. A liquid crystal display having a pair of substrates and a liquid crystal sealed between the pair of substrates, wherein a substrate for a liquid crystal display according to claim 2 is used as either of the substrates.

* * * * *

UNITED STATES PATENT AND TRADEMARK OFFICE
CERTIFICATE OF CORRECTION

PATENT NO. : 6,873,388 B2
DATED : March 29, 2005
INVENTOR(S) : Tsukao et al.

It is certified that error appears in the above-identified patent and that said Letters Patent is hereby corrected as shown below:

Title page,
Item [75], Inventors, delete "Teiji Majima".

Column 12,
Line 60, between "formed" and "the drain" insert -- on --

Signed and Sealed this

Nineteenth Day of July, 2005

JON W. DUDAS
*Director of the United States Patent and Trademark Office*